(12) United States Patent
Orsini

(10) Patent No.: US 8,911,841 B2
(45) Date of Patent: Dec. 16, 2014

(54) PACKAGING POUCH WITH FOOD FLOW PROPERTIES

(75) Inventor: Lorenzo Maria Orsini, Thiene (IT)

(73) Assignee: Amcor Flexibles Kreuzlingen Ltd., Kreuzlingen (CH)

( * ) Notice: Subject to any disclaimer, the term of this patent is extended or adjusted under 35 U.S.C. 154(b) by 0 days.

(21) Appl. No.: 13/983,434

(22) PCT Filed: Feb. 2, 2012

(86) PCT No.: PCT/EP2012/000458
§ 371 (c)(1),
(2), (4) Date: Aug. 2, 2013

(87) PCT Pub. No.: WO2012/107181
PCT Pub. Date: Aug. 6, 2012

(65) Prior Publication Data
US 2013/0313153 A1   Nov. 28, 2013

(30) Foreign Application Priority Data
Feb. 9, 2011   (EP) ..................................... 11001025

(51) Int. Cl.
| *B29D 22/00* | (2006.01) |
| *B29D 23/00* | (2006.01) |
| *B32B 1/08*  | (2006.01) |
| *B65D 85/72* | (2006.01) |
| *B32B 27/00* | (2006.01) |
| *B65D 39/00* | (2006.01) |
| *C08L 51/00* | (2006.01) |
| *C08L 51/08* | (2006.01) |
| *C09D 151/00* | (2006.01) |
| *C09D 153/00* | (2006.01) |
| *C09D 187/00* | (2006.01) |

(52) U.S. Cl.
CPC ................ *B65D 85/72* (2013.01); *B32B 27/00* (2013.01); *B65D 39/00* (2013.01); *C08L 51/003* (2013.01); *C08L 51/085* (2013.01); *C09D 151/00* (2013.01); *C09D 153/00* (2013.01); *C09D 187/00* (2013.01)
USPC ........................ 428/35.7; 428/35.2; 206/524.3

(58) Field of Classification Search
USPC .............................. 428/35.2, 35.7; 206/524.3
See application file for complete search history.

(56) References Cited

U.S. PATENT DOCUMENTS 1,059,534 A   12/1991  Wyman
5,093,194 A    3/1992  Touhsaent et al.
(Continued)

FOREIGN PATENT DOCUMENTS

CN   1059534 A   3/1992
CN   1697731 A   11/2005
(Continued)

OTHER PUBLICATIONS

PCT International Search Report Issued for Application No. PCT/EP2012/000458 Completed May 11, 2012 and mailed May 23, 2012.
(Continued)

*Primary Examiner* — Michael C Miggins
(74) *Attorney, Agent, or Firm* — RatnerPrestia

(57) ABSTRACT

In a packaging pouch made of a flexible mono or multilayer film for packaging viscous jelly and/or gravy matrix food, in which a thermo cycle such as retort, pasteurization, hot filling or aseptic conditions are applicable, the surface of a layer of the film forming the pouch inner walls or a surface coating on the film being in contact with food comprises a substance having the effect that the surface tension of the layer or the surface coating on the layer is 24 mN/m or less and the pouch inner walls being in contact with food exhibit easy flow properties.

11 Claims, 1 Drawing Sheet

(56) References Cited

U.S. PATENT DOCUMENTS

| | | | |
|---|---|---|---|
| 6,528,134 | B1 | 3/2003 | Buelow et al. |
| 1,697,731 | A1 | 11/2010 | Cruz |
| 2007/0179230 | A1 | 8/2007 | Sperlich et al. |

FOREIGN PATENT DOCUMENTS

| | | |
|---|---|---|
| EP | 0 065 742 | 12/1982 |
| EP | 1 174 457 | 1/2002 |
| EP | 1 808 291 | 7/2007 |
| EP | 2 208 604 | 7/2010 |
| JP | 2010125672 | 6/2010 |
| WO | WO 2004/050357 | 6/2004 |
| WO | WO 2005/092609 | 10/2005 |
| WO | WO 2008/009865 | 1/2008 |

OTHER PUBLICATIONS

English Language Translation of the First Office Action and Search Report Issued by the Chinese Patent Office for Application No. CN 201280008522.5 Issued Aug. 28, 2014.

US 8,911,841 B2

PACKAGING POUCH WITH FOOD FLOW PROPERTIES

CROSS-REFERENCE TO RELATED APPLICATIONS

This is a U.S. National Phase application of International application number PCT/EP2012/000458, filed Feb. 2, 2012, which claims priority benefit of European Application number 11 001 025.3, filed Feb. 9, 2011, both of which are incorporated herein by reference in their entirety for all purposes.

FIELD OF THE INVENTION

The invention relates to a packaging pouch made of a flexible mono or multilayer film for packaging viscous jelly and/or gravy matrix food, in which a thermo cycle such as retort, pasteurisation, hot filling or aseptic conditions are applicable, wherein the surface of a layer of the film forming the pouch inner walls or a surface coating on the film being in contact with food comprises a substance having the effect that the surface tension of the layer or the surface coating on the layer is 24 mN/m or less and the pouch inner walls being in contact with food exhibit easy flow properties.

BACKGROUND OF THE INVENTION

Nowadays cooked and ready meals for human and pet consumption are really common. A conspicuous part of such food is sold in flexible flat/pillow or stand-up pouches. Pouches are produced and filled in line or as a two-step production. During the filling process several ingredients are inserted in solid and liquid states while the pouch is kept open. After filling, the pouch is sealed on the top and may pass through a thermal process for pasteurisation or sterilisation. However, part of the ingredients during filling can touch the inner walls of the pouch, and if this material does not flow down inside the pouch quickly, it will contaminate the sealing area and the pouch will not be sealed completely compromising food integrity.

A possible technological solution is to use ultrasonic sealing tool that is normally an expensive investment and not suitable for all material structures. With the same principle, when the consumer will empty the pouch, part of the meal will get in contact with pouch walls, and food which is not fast flowing out of the pouch will be quite inconvenient for the consumer that would need to use tools or shake/squeeze the pouch with the risk to spread food around. In case of pet food, consumers are even less keen in using a tool or touch the food by trying to empty the pouch. This explains why having a pouch exhibiting easy and fast flowing of the food along the inner walls can strongly reduce rejections during filling, decrease food safety risk and be an important consumer convenience feature in the field of ready meals and wet pet food in pouches. As an example, ready meal pouches may contain meat, vegetables, rice in gravy or sauce added during filling and juice produced by the food during retort cooking. Pet food pouches may contain meat based food in jelly or gravy and juice produced during retort. Ready sauce pouches may be vegetable, meat or fat (eggs, butter) based and sterilised or pasteurised.

EP-A-1 808 291 discloses a packaging material made of thermoplastic polymers suitable for packaging foods. To prevent pasty and fatty foods from adhering to packaging material, a nonstick composition comprising a fatty ester of a polyhydric alcohol having at least one fatty acid radical per ester molecule with 19 or more carbon atoms is incorporated into at least one selected area of a polymer packaging material. A permanent nonstick effect is observed even if the fatty acid ester is included only in surface-close regions or layers of the packaging material. The outer layer in which the fatty acid ester additive is contained can be a sealing layer. The packaging preferably has the form of a pouch.

WO 2004/050357 A1 discloses a laminate useful in the manufacture of packages for containers, in particular ovenable resistant food containers. The laminate includes a substrate, preferably of a paperboard, and a food contact release layer comprising a blend of polymethylpentene and polypropylene bonded to one side of the substrate. The food contact release layer has a lower surface tension than the food product to come into contact with the release layer and thus offers a good release from food products, particularly those containing high levels of starch and sugar.

WO 2005/092609 A1 discloses a coextruded biaxially oriented PET film with food release properties having a sealable skin layer comprising a hot melt adhesive resin. The skin layer may further comprise fatty aides, waxes or silicon oils and particulate substances such as silica, clay and calcium carbonate.

WO 2008/009865 A1 discloses a fluoropolymer having antibacterial activity. Onto the fluoropolymer there is grafted at least one unsaturated monomer comprising a functional group functional group providing the antibacterial activity and an anion. The functional group providing antibacterial activity is a quaternary ammonium group, a phosphonium group, or a saturated or unsaturated heterocycle comprising a nitrogen atom, chosen from piperidine, piperazine, morpholine, thiomorpholine, thiazole, isothiazole, pyrazole, indole, indazole, imidazole, benzimidazole, quinoline, isoquinoline, benzotriazole, benzothiazole, benzoisothiazole, benzoxazole, benzoxazine, isoxazole, pyrrole, pyrazine, pyrimidine, pyridazine, quinazoline and acridine.

EP 1 174 457 A1 discloses a biaxially oriented polyester film with release properties in aqueous environment. The film, which is used in metal cans as inner release coating, comprises a polyester in which ethylene terephthalate units and/or ethylene naphthalate units are the main structural components, and a wax compound and for silicon compound.

U.S. Pat. No. 6,528,134 B1 discloses a coextruded film with release and dead fold properties for packaging cheese. The film comprises three layers of polyethylene or polypropylene and glycerol monostearate as cheese release agent.

From the aforementioned prior art documents, packaging films having antistick or release properties are known.

EP 2 208 604 A1 discloses a packaging pouch made of a flexible mono or multilayer film for packaging viscous jelly and/or gravy matrix food, in which a thermo cycle such as retort, pasteurisation, hot filling or aseptic conditions are applicable. The surface of a layer of the film forming the pouch inner walls or a surface coating on the film being in contact with food comprises a substance based on a molecule and or molecules system, defined as mixture of different molecular weight and/or molecular structure, functionalised by siloxane and/or fluorinated groups so that the surface tension of the layer or the surface coating on the layer is 24 mN/m or less and the pouch inner walls being in contact with food exhibit easy flow properties.

SUMMARY OF THE INVENTION

The object of the present invention is to provide a packaging pouch made of a flexible mono or multilayer film for packaging viscous jelly and/or gravy matrix food, in which a thermo cycle such as retort, pasteurisation, hot filling or aseptic conditions may be applicable, and which exhibits easy food flow properties of the pouch inner walls being in contact with food. The surface layer of pouch inner walls being in contact with food are typically polypropylene or polyethylene based sealing layers.

DETAILED DESCRIPTION OF THE INVENTION

The aforementioned objective is achieved by way of the invention in that the substance comprises
a graft polymer having a polyolefin based acrylic copolymer backbone with the general structure

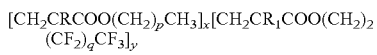

with R=H, CH$_3$; R$_1$=H, CH$_3$; 0<p<35; 0<q<15; 40>y/x>0.03
or
a graft polymer having a polysiloxane based acrylic copolymer backbone with the general structure

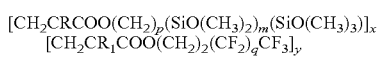

with R=H, CH$_3$; R$_1$=H, CH$_3$; 1<p<4; 0<q<15; 1<m<50; 40>y/x>0.03
or
a graft polymer having a polysiloxane/polyolefin based copolymer backbone with the general structure

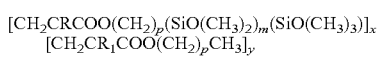

with R=H, CH$_3$; R$_1$=H, CH$_3$; 1<p<4; 0<q<15; 1<m<50; 40>y/x>0.03
or
a block structure with the extended formula

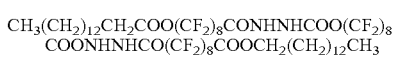

of the general structure

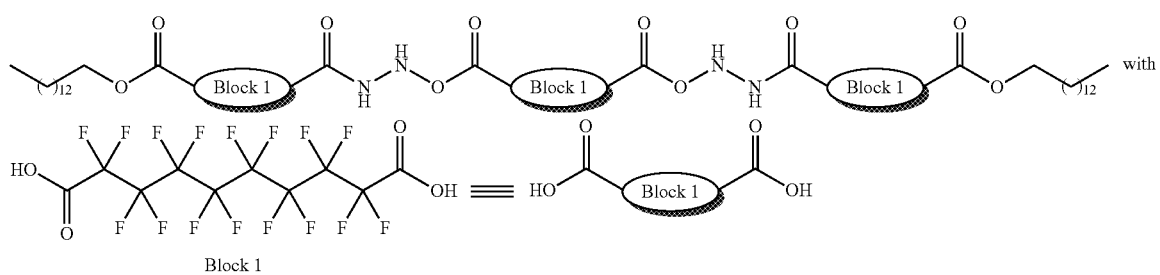

Block 1 or
a micro-dispersion of ultra high molecular weight siloxane polymers with a preferred average particle size of 5 μm.

Such micro-dispersions are known as Siloxane Masterbatches (Dow Corning®), suitable products are e.g. MB50-001 and MB50-321.

Preferably the surface tension of the layer or the surface coating is 21 mN/m or less.

The pouch can withstand thermo cycles up to 135° C. for 90 min. This solution provides easy flow property also in case of aseptic filling application. A further application is related to products making problems during filling operation due to their rheology. An example is the filling of ketchup sachets where process output makes the difference on the market. Increasing the speed of filling causes problems of product spilling out from the sachet and contaminating the sealing area of the sachet. With the easy flow properties of the packaging material according to the present invention it is possible to increase the process speed without the aforementioned problems To measure easy flow properties, there does not exist a scientific method such as for measuring the surface tension. However, it has been found that easy flow properties are correlated to surface tension. Therefore, a methodology and a tool to evaluate easy flowing has been developed by the inventors and will be explained later.

The layer of the film forming the pouch inner walls or the surface coating on the film preferably contains 0.01 to 10 wt. %, more preferably 0.5 to 3 wt. %, of the substance.

The layer of the film forming the pouch inner walls may be a coextruded layer or a monolayer. Since the substance migrates to the surface of layer of the film forming the pouch inner walls being in contact with food, an enrichment of the substance in a surface layer takes place, and consequently the concentration of the substance in this surface layer will increase with time and may therefore be higher than the overall concentration of the substance in the layer.

Preferably the surface of the layer of the film forming the pouch inner walls is polypropylene or polyethylene based.

The substance can be part of an organic or inorganic additive or filler material contained in the layer of the film forming the pouch inner walls or the surface coating on the film providing easy food flow properties. A preferred filler material is fumed silica, e.g. Aerosil® from Evonik.

The layer of the film forming the pouch inner walls can be additivated with addive or filler during production through blown or cast extrusion such as non-oriented, mono- or biaxial oriented film.

The surface coating on the film can be applied e. g. by rotogravure, flexography, spray coating, extrusion coating, curtain coating or atmospheric plasma treatment.

The packaging pouch according to the present invention can be of any shape or design, e.g. a flat pouch or a stand-up pouch, a pouch in the form of a doypack, a pillow, or a cheerpack.

With the packaging pouch according to the present invention easy flow properties are active during filling, i.e. food processing, as well as during food emptying by the consumer when the food is consumed.

The following laminates are examples of packaging materials suitable in the production of packaging pouches according to the present invention:
Polyester/adhesive/polyamide/adhesive/polypropylene
Polyester/adhesive/polyamide/adhesive/polyethylene
Polyester/adhesive/polyester/adhesive/polypropylene
Polyester/adhesive/polyester/adhesive/polyethylene
Polyester/adhesive/aluminium/adhesive/polypropylene
Polyester/adhesive/aluminium/adhesive/polyethylene
Polyester/adhesive/polyethylene
Polyester/adhesive/polypropylene
Polyester/adhesive/polyester/adhesive/polyamide/adhesive/polyethylene
Polyester/adhesive/polyester/adhesive/polyamide/adhesive/polypropylene
Polyester/adhesive/aluminium/adhesive/polyamide/adhesive/polypropylene To provide barrier properties, polyester and/or polyamide of the above structures without aluminium can be as well coated with a ceramic material, such as $SiO_x$ or $AlO_x$, or coated with an organic barrier material. Polyethylene and polypropylene films can be as well coextruded with EVOH and mono- or bi-oriented. Polyester films, such as PET films, can be metallised.

The polyethylene or polypropylene layer is a sealing layer forming the pouch inner walls.

BRIEF DESCRIPTION OF THE DRAWINGS

Further advantages, features and details of the invention are revealed in the following description of preferred exemplified embodiments and with the aid of the drawing which shows schematically in FIG. 1 the apparatus used to evaluate easy flow properties.

Test strips 18 are fixed on the leaning table 10 in a horizontal starting position, i.e., the tilting angle of the leaning table 10 at the start of each test is 0°. In this position, a portion of food 20—in the present tests a portion of ketchup—is placed onto the surface of the test strip 18 at a starting line 22. Thereafter the leaning table is pivoted about the hinge-joint 12 from the starting position at 0° to and end position at a tilting angle of 50° within 3 minutes. Immediately when the tilting angle reaches 50°, photos of test strips are taken and visually analysed. The quantity of ketchup used in the tests are drops of 2 ml and 0.5 ml ketchup.

Wettability Tests

Figure 1:
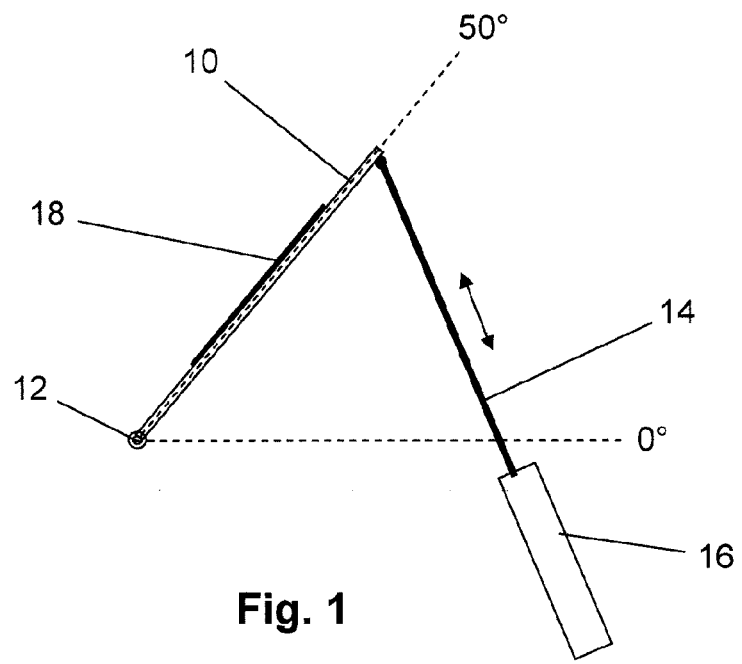
As shown in FIG. 1, a lower end of a leaning table 10 is fixed to a hinge-joint 12. A piston 16 of a cylinder 14 is linked to an upper end of the leaning table 10. The piston 16 can be extended at a constant speed of 0.01 to 1 m/min.
Figure 2:
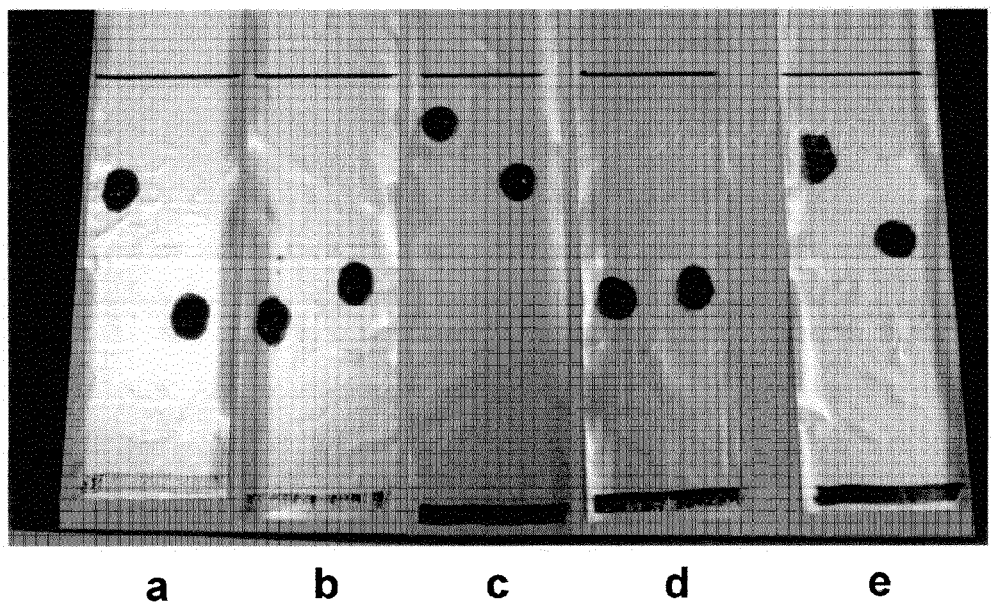
FIG. 2 the top view of laminate according to the present invention and standard material at the end of the same easy flow test.

FIG. 2a-e show test strips each at the end of the test. The strips shown in FIG. 2e is a standard polypropylene film without additive, FIG. 2a-d are based on a polypropylene film with the following additives:

FIG. 2a: 5 wt % MB50-001
FIG. 2b: 10 wt % MB50-001
FIG. 2c: 5 wt % MB50-321
FIG. 2d: 10 wt % MB50-321

Results:

Ketchup drops start moving before and faster on the modified samples (FIG. 2a-d) compared to the standard sample (FIG. 2e)

Also the lines drawn by using a black marker are showing a different wettability, the lowest on the left and the highest on the right on the standard product where the ink is perfectly adhering on the surface.

Seal properties resulted to be in line with standard material. All the previous evaluations were made before and after retort.

No major problems were faced during extrusion of these products.

The test results clearly demonstrate the superiority of an additive according to the present invention on the easy flow properties.

Surface Tension Tests

Surface tension measurements have been carried out on film material based on standard polypropylene (PP) with different concentration of graft polymer having a polyolefin based acrylic copolymer backbone with the general structure

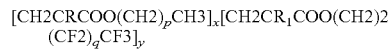

with
R=H; $R_1$=H; p=29; q=7; y/x=15 (Copolymer E)
R=H; $R_1$=H; p=29; q=7; y/x=5 (Copolymer F)

The results are presented in the following table.

| Film material | Surface tension [mN/m] |
|---|---|
| Standard PP | min. 25 |
| Standard PP + 1 and 2 wt. % Copolymer E | min. 22 |
| Standard PP + 1 wt. % Copolymer F | min. 25.5 |
| Standard PP + 2 wt. % Copolymer F | min. 24 |

The invention claimed is:

1. A packaging pouch made of a flexible mono or multilayer film for packaging viscous jelly and/or gravy matrix food, in which a thermo cycle such as retort, pasteurisation, hot filling or aseptic conditions is applicable, wherein the surface of a layer of the film forming the pouch inner walls or a surface coating on the film in contact with food comprises a substance having the effect that the surface tension of the layer or the surface coating on the layer is 24 mN/m or less and the pouch inner walls in contact with food exhibit easy flow properties, wherein
the substance comprises
a graft polymer having a polyolefin based acrylic copolymer backbone with the general structure

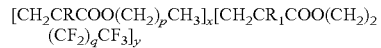

with R=H, $CH_3$; $R_1$=H, $CH_3$; 0<p<35; 0<q<15; 40>y/x>0.03 or a graft polymer having a polysiloxane based acrylic copolymer backbone with the general structure

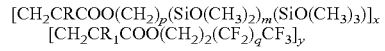

with
R=H, $CH_3$; $R_1$=H, $CH_3$; 1<p<4; 0<q<15; 1<m<50; 40>y/x>0.03 or a graft polymer having a polysiloxane/polyolefin based copolymer backbone with the general structure

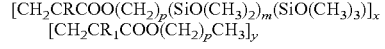

with
R=H, $CH_3$; $R_1$=H, $CH_3$; 1<p<4; 0<q<15; 1<m<50; 40>y/x>0.03 or a block structure with the extended formula

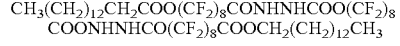

with the general structure

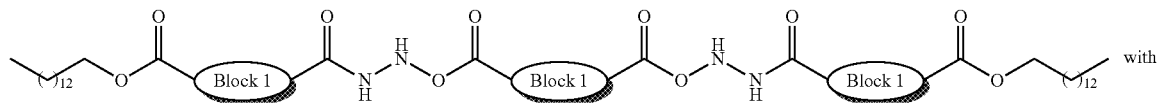

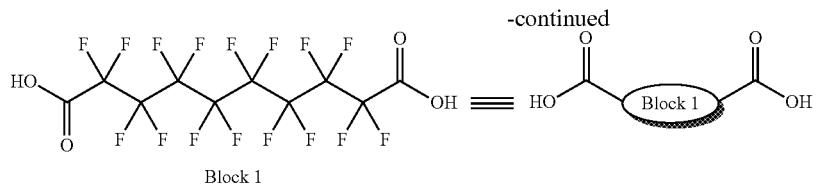

Block 1

-continued

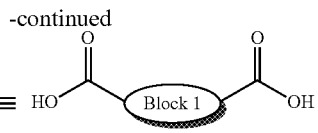

or a micro-dispersion of ultra high molecular weight siloxane polymers.

2. A packaging pouch according to claim 1, wherein the surface tension of the layer or the surface coating is 21 mN/m or less.

3. A packaging pouch according to claim 1, wherein the layer of the film forming the pouch inner walls or the surface coating on the film contains 0.01 to 10 wt. % of the substance.

4. A packaging pouch according to claim 1, wherein the surface of the layer of the film forming the pouch inner walls is polypropylene or polyethylene based.

5. A packaging pouch according to claim 1, wherein the substance is part of an organic or inorganic additive or filler material contained in the layer of the film forming the pouch inner walls or the surface coating on the film providing easy food flow properties.

6. A packaging pouch according to claim 1, wherein the layer of the film forming the pouch inner walls is additivated with at least one additive or filler during production through blown or cast extrusion.

7. A packaging pouch according to claim 1, wherein the surface coating on the film is applied by rotogravure, flexography, spray coating, extrusion coating, curtain coating or atmospheric plasma treatment.

8. A packaging pouch according to claim 1 in the form of a doypack, a stand-up pouch, a pillow, a flat pouch or a cheerpack.

9. A packaging pouch according to claim 1, wherein the substance is a micro-dispersion of ultra high molecular weight siloxane polymers with an average particle size of 5 µm.

10. A packaging pouch according to claim 1, wherein the layer of the film forming the pouch inner walls or the surface coating on the film contains 0.5 to 3 wt. % of the substance.

11. A packaging pouch according to claim 1, wherein the substance is part of a fumed silica contained in the layer of the film forming the pouch inner walls or the surface coating on the film providing easy food flow properties.

* * * * *